April 5, 1960 O. L. DUPY 2,931,689
AUTOMATIC PROGRAMMING SYSTEM AND METHOD FOR RECORDING OF CONTROL RECORDS
Filed Oct. 25, 1955
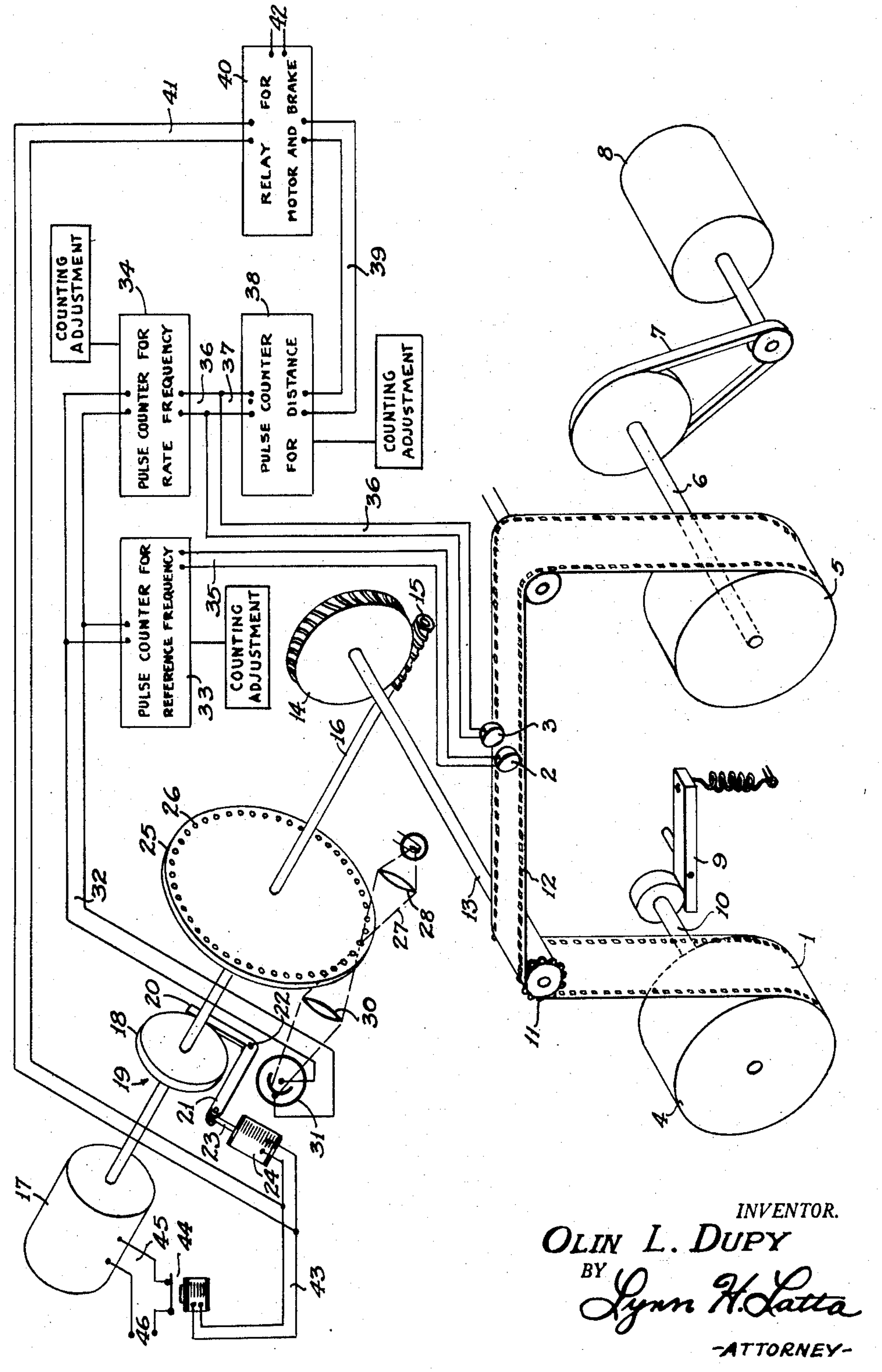
INVENTOR.
OLIN L. DUPY
BY Lynn H. Latta
-ATTORNEY- United States Patent Office 2,931,689

Patented Apr. 5, 1960

2,931,689

AUTOMATIC PROGRAMMING SYSTEM AND METHOD FOR RECORDING OF CONTROL RECORDS

Olin L. Dupy, West Los Angeles, Calif., assignor to Magnasync Manufacturing Company, Ltd., North Hollywood, Calif., a corporation of California Application October 25, 1955, Serial No. 542,600

11 Claims. (Cl. 346—74)

This invention relates to the programming of numerical information and recording this information on recording media which information, when reproduced, can be used to accurately control, in a robot apparatus, the motion of a theoretical point along a predetermined path in three ordinate planes (X—Y—Z). The motion thus developed can be applied to many useful operations. For example, it can be utilized in the control of production machinery such as lathes, milling and routing machines, etc., for the machining of intricate shapes exactly to a pattern called out in an engineering drawing. The invention contemplates recording on any suitable recording medium, such as apertured 35 mm. film strip, magnetic recording tape, wire, endless belt, disc record, etc., or on a plurality of such record media, interlocked for unison operation. The general object of the invention is to provide an improved method of programming and recording a plurality of interlocked record tracks on such a record medium or media.

The information for controlling machine movement in the respective axes is recorded as a series of spaced signal units (e.g. magnetic pulses) recorded on separate, parallel tracks along the length of a recording medium or a plurality of interlocked recording media. A separate recording head is used for each track and the recording medium is moved past these heads by suitable drive means (such as a rotating sprocket with teeth that accurately engage in sprocket apertures along the edges of record film). This links together the linear movement of the recording medium and the rotation of the drive means. With this recording system a predetermined fraction of a revolution of the drive means is measured and an electrical pulse delivered to the recording head, causing a plurality of equally spaced signal units (e.g. magnetic pulses) on the recording medium. All records of movement in the three axes can be made simultaneously or, with a single system, the recording means can be rewound to a start mark and each record track made separately.

To reproduce the information, the record medium (e.g. film) is moved, at a fixed rate, past a reproducing head (e.g. magnetic). This reproducing head senses the signal units and produces an alternating current signal. The frequency of this signal, in cycles per second, is determined by the number of signal units per second that pass the reproducing head.

A change in the spacing of the signal units on the recording medium is accomplished by selecting a larger or smaller fraction of a revolution of the drive means to trigger the signal unit (e.g. pulse) to the recording head. By accurately controlling this angular measuring and pulse triggering system, a large number of different spacings for the recorded pulses can be selected to develop a wide range of signal frequencies upon reproduction. This signal is amplified to produce sufficient power to drive synchronous motors. Thus the invention provides an accurate method of preselecting, recording, and reproducing a signal capable of driving a synchronous motor over a wide range of absolute speeds.

The effective operation of apparatus such as a power machine tool calls for zero motion and variations of speed at fixed rates in either direction from zero. A signal of zero cycles per second is reproduced as zero power, and in attaining this result, a single synchronous motor cannot be operated with the required latitude of variable speeds. To achieve zero motion, a differential gear system is used, having two identical synchronous motors on the input drive shafts. The output shaft then rotates at a speed equal to the difference between the two motors which are driven by signals derived from separate parallel tracks recorded on the film.

By maintaining the same spacing between signal units on one of these tracks, the motor driven by the signal from this track will run at a constant speed. This track (herein designated the reference track) reproduces the reference signal which maintains a fixed number of cycles per second. The synchronous motor driven by this reference signal rotates at the reference number of revolutions per second. Another track (control track) used to control the speed of another motor (control motor) when recorded with a wider spacing between signal units, will generate fewer cycles per second than the reference signal and the motor being driven by this signal will rotate fewer revolutions per second. The output shaft of the differential gear system will then rotate in a direction, and at a speed that is the difference between the speeds of the two motors. If this control track is made with less space between signal units, the reproduced signal will have a greater number of cycles per second than the reference signal. This greater frequency will revolve the control motor at a speed above that of the reference motor and the output shaft of the differential gear system will rotate in a reverse direction and at a speed equal to the difference between the speeds of the two motors.

With the film driven at a fixed speed for reproducing the signal, the frequency of the reproduced signal is in inverse proportion to the space between the signal units (e.g. magnetic pulses) that are recorded on the recording medium (e.g. magnetic coating of a sprocket driven film). However, the movement of the output shaft of the differential gear system is determined by the difference in the frequencies of the signals that are driving the two synchronous motors connected to the two input shafts. Therefore the total number of revolutions of the output shaft for a given length of record is in proportion to the total differences in the spacing of the signal units on the two records that may have been recorded in that length. Changing the speed of the film, when reproducing the record, will change the rate of movement but not the amount.

With a given signal unit spacing selected for producing the reference track, a certain spacing between the signal units of the control track can be assigned, by design, to produce a given amount of movement of the differential output shaft in a given direction, for each signal unit recorded at that spacing. The total distance traveled in that direction is determined by the number of signal units recorded at that spacing. Any number of synchronous motors can be driven by the amplified signal from the reference track and used to drive one of the input shafts of any number of differential gear systems. The other input shafts are driven by synchronous motors that receive their control signals from separate control tracks. For example, the shaping of a piece of material on a milling machine would require the control of the rate, distance, and direction of movement of the work table in at least three directions, lateral, horizontal and vertical. Other controlled drives may be added to change the cutter angle in one or two axes to shape more complicated parts.

All of the records are embodied in parallel tracks on the recording medium or media. Assurance that all operative movements will occur in proper time relation with each other is achieved by having the tracks interlocked for unison operation, as by being placed in parallel on one piece of film or carried by separate record elements that are interlocked mechanically or electrically or otherwise. The invention requires no servo system in any form. The mechanism, the motion of which is to be controlled, is in effect geared to the several record tracks on the film.

A further object of the invention is to provide a novel and improved recording system to automatically produce and simultaneously record information for any motion that can be stated in terms of direction and distance, i.e., distance along a path at a given angle to a reference direction. A complex path can be developed as the aggregate of a series of incremental paths, each a straight line and subtending a fixed angle to the reference direction.

The recording medium or media may be provided with an additional track for a third signal, which may be utilized to control movement parallel to a third axis at right angles to the traverse axis, for variations in depth.

Movement along a primary axis (longitudinal movement) can be controlled by the response, in a reproducer apparatus, to a derivative signal received from the record element (the term "derivative signal" is used to designate a continuing signal which may comprise a differential between one series of signal units and a reference series of signal units of fixed spacing). Movement along a transverse axis (traversing movement) can be controlled by reproducer response to a second derivative signal, comprising a differential between another series of signal units and the reference series, received simultaneously with the first signal. Pure longitudinal movement parallel to the primary axis will be produced when the second derivative signal calls for no transverse movement. Movement at right angles to the primary axis will be produced when only the second derivative signal is calling for movement. Movement along a diagonal path (longitudinal movement plus traverse) will occur when both derivative signals are calling for movement.

A primary object of the invention is to provide a system wherein accurate coordination of the responses of the reproducer to the several signals (interlocking) is assured. To this end, a basic feature of the invention is the provision of a record track which produces a reference signal, to which the responses from the other record tracks are related.

An important object is to provide a method for making a record which can be programmed through the use of relatively simple mathematical data readily developed from an engineering drawing disclosing the contours and profiles to be produced in the work. In general, this is accomplished by utilizing a pulse generator as a source of primary (high frequency) pulses. Several preset pulse counters are arranged to be actuated by these primary pulses to count the same and to produce respective secondary (low frequency) pulses after having counted a predetermined number (which may vary with the respective counter) of primary pulses. The pulse counters automatically reset themselves and continue counting and producing additional secondary pulses until stopped. A first counter may produce the reference frequency pulses. A second counter (longitudinal counter) may produce the control frequency pulses for longitudinal movement. A third counter (traverse counter) is then utilized for producing the traverse control pulses. Another counter (distance counter) is utilized to effect automatic stopping of the entire recording system when the information for a pre-determined distance of movement along a given increment of the cutter path has been recorded on the film.

For example, the engineering drawing of a piece to be milled may show a shape starting with a straight cut parallel to the base of the work for a distance of three inches, may then proceed for two inches (as measured along the primary axis) along a 45° diagonal and may then continue for another ten inches along the primary axis, at a 5° divergence from the primary axis, and so on until the cut reaches the end of the work piece. To make a record of the movement necessary to produce such a cut (assuming that the first counter is already set to count at a suitable reference frequency) the distance counter is first set for a length of operation so related to the reference frequency as to provide for the initial three inches of reproducer operation. The longitudinal counter is set to count at a rate so related to the reference frequency as to produce a suitable differential frequency for effecting the desired longitudinal movement of the cutter in the reproduction operation, for the three inches of movement. The traverse counter is set to count at the same rate of cutter movement as the first counter, thus providing for zero divergence from the primary axis, i.e., a cut parallel to the base. The counting proceeds until the film has advanced a distance corresponding to three inches of cutter movement, and the entire recording apparatus is then stopped by the distance counter. The operator then will reset the distance counter for an advance of two inches and will reset the traverse counter for counting at a rate such as to produce a differential count equal to that of the longitudinal counter, the counting rate of the traverse counter being slower or faster than the reference frequency depending upon whether the divergence is to proceed to the right or to the left of the primary axis. Either of these differential counts of the traverse counter, as equated to that of the longitudinal counter, will result in equal forward and transverse movements, with a resultant 45° angle of movement as recorded on the film. At the end of two inches forward movement, the distance counter automatically stops the movement. The distance counter is then set for ten inches of forward movement and recording operation proceeds until such ten inches is counted, with the transverse movement being related to the forward movement so as to produce the 5° divergence called for.

In the use of the film thus recorded in the reproducing apparatus, the cut called out in the engineering drawing is automatically reproduced in a continuous movement wherein the cutter first moves straight forwardly along the primary axis a distance of three inches, then moves forwardly and laterally along a 45° angle for another two inches of forward advance, and then moves forwardly and laterally along the 5° divergence for another ten inches of movement, producing exactly the contour called for by the engineering drawing.

Other objects will become apparent in the ensuing specifications and appended drawing, which discloses a schematic represenattion of the recording system of the invention.

Referring now to the drawing in detail, by way of example there is shown at 1 a recording film which has a suitable recording (e.g. magnetic) coating adapted to record magnetic pulses delivered from a plurality of recording heads 2 and 3 suitably related to the film 1 in laterally spaced relation so as to produce parallel, laterally spaced sound tracks on the film 1. Although only one head 3 is shown, it will be understood that it is intended to schematically indicate several heads, one for recording a control track representing longitudinal movement, another for recording a second control track representing transverse movement, and (where three dimensional sculpturing is called for) a third recording head for recording a track representing depth movement. Any suitable mechanism to provide for linear movement of the film 1 past the recording heads 2 and 3 may be utilized. For example, the film may be unwound from a feed reel 4 and rewound on a takeup reel 5 driven through a shaft 6, a belt and pulley drive 7 for maintaining uniform tension and take-up, and a torque motor 8 for applying the drive thereto. A tension brake unit 9, for holding back the feed reel 4, may be connected to the latter through the shaft 10 thereof.

The belt drive 7 is a slipping drive, reeling in the film 1 only as fast as the latter is advanced by a film drive sprocket 11 the teeth of which mesh in apertures 12 in the film 1 in accordance with conventional film drive practice. Sprocket 11 is carried by a shaft 13 to which is affixed a worm gear 14. Driving the gear 14 is a worm 15 on a shaft 16 which is driven by an electric motor 17. Secured on shaft 16 is the rotor 18 of a brake 19 which includes a shoe 20 frictionally engaging the periphery of rotor 18. Shoe 20 may form one arm of a bell crank 21 pivoted at 22 to a fixed support and operated by the armature 23 of a solenoid 24. The brake 19 is designed to effect rapid stopping of motor 17 when solenoid 24 is energized. To be more explicit, brake 19 is adapted to stop the motor 17 within the interval between successive pulses of the secondary series of pulses hereinbefore referred to.

The primary pulses are generated by a pulse generator which may consist in a light chopper disc 25 secured to shaft 16 and having a series of apertures 26 through which is projected the focused section of a light beam 27 gathered by a focusing lens 28 from a spreading bundle of light rays which is focused by a condensing lens 30 upon the cathode of a photoelectric cell 31. As the disc 25 rotates, a succession of light flashes will thus be projected against the photoelectric cell 31 and will energize the same to produce a series of electric pulses in the primary pulsing circuit which is indicated at 32.

Connected in parallel to the primary pulsing circuit 32 are a first pulse counter 33, for counting reference frequency pulses, a second pulse counter for counting control frequency pulses, indicated at 34.

Each of the counters 33 and 34 is adapted to count the primary pulses received through primary pulsing circuit 32 and to deliver a respective secondary pulse into a respective secondary pulsing circuit 35 (for counter 33) and 36 (for counter 34). Circuits 35 and 36 convey the secondary pulses to the magnetic recording heads 2 and 3 respectively, which utilize these secondary pulses for imprinting the respective pulse record tracks on the film 1.

Counters 33 and 34 are electronic counters of the type adapted to have accumulative response to a series of pulses, beginning at a starting point and continuing up to a discharge point where the cumulative effect of the total number of pulses for which the counter has been set will cause the counter to discharge a secondary pulse, setting itself back to the starting point in doing so. Furthermore, each counter is of a type capable of discontinuous operation, i.e., receiving and retaining the effect of a portion of the number of pulses required for effecting the discharge of a secondary pulse, resting for an interval of time, and then resuming the pulse receiving operation, adding the effect of the subsequently received pulses to those of the initially received pulses so that, when the total of the pulses received in the two discontinuous receiving stages reaches the discharge total for which the counter is set, the discharge will take place the same as though the counting had been continuous from start to discharge. The retention of the effect of the initially received pulses, for addition to that of resumed reception pulses, is hereinafter referred to as the "storing" or "remembering" of pulses. Thus, even though the operation of the apparatus is interrupted during the start and the discharge point in the reception of a series of pulses by a counter, the number of pulses occurring between the start and discharge point will be the same as though the reception had been continuous from start to discharge.

Since the drawing is schematic, the showing of counter 34 may be taken as representing one or any number of control pulse counters, it being understood that at least one additional counter, hooked up in parallel with counter 34 and with a separate output circuit leading to an additional recording head, will be utilized in every case to provide for transverse movement.

The details of circuitry for the pulse counting units 33 and 34 are not disclosed, since the invention contemplates using any well known electronic pulse counting apparatus having mechanism for preselecting the count so as to provide a suitable spacing range for the rate at which the secondary pulses are delivered in ratio to the input rate in the primary pulsing circuit 32. It will be understood also that each of the counting units 33 and 34 embody suitable amplifier apparatus so that the secondary pulses delivered to recording heads 2 and 3 are of sufficient intensity to provide sufficiently strong magnetic impulses for the proper recording on the magnetic coating of film 1. It is also to be understood that the adjusted mechanism, especially for the control frequency counter 34 or counters, is adapted for easy manipulation by the operator, with suitable indicator dials for accurately setting the output frequency at exactly the desired rate as determined from mathematical data provided in the engineering calculations from which the settings are directly made.

The secondary pulsing circuit 36 includes, as a parallel branch thereof, circuit 37 leading to the limit pulse counter 38, which counts the secondary pulses delivered from counter 34. Using the secondary pulses for its input, counter 38 delivers a single pulse at its output, into a motor brake relay circuit 39 which includes a relay 40, energized by such output pulse to close a circuit 41 which is supplied by electric current from a suitable source 42 at a sufficient intensity to energize solenoid 24 in circuit 41 and set the brake. As a part of circuit 41, a parallel branch 43 simultaneously supplies a portion of the power from source 42 to a relay 44 for de-energizing motor 17. Relay 44, when closed completes a circuit 45 through which power for operating motor 17 is delivered from a suitable source 46. Relay 44 is of a type which, once closed will remain closed until opened by the energization of its operating coil. Accordingly, a manual starting means may comprise simply a suitable button for forcibly closing relay 44.

Setting or adjustment devices for the respective counters are indicated in block diagram, labelled "counting adjustment" in each instance.

In the operation of the system, the operator determines, from the engineering and mathematical data before him, the proper setting of counters 33 and 34. In many cases the setting of counter 33 may remain unchanged over a succession of changes in the setting of counters 34. Counters 34 are set for the first phase of operation in which the cutter moves in a given direction. If the cutter is to move only in a longitudinal direction, the counter 34 for longitudinal movement control is set for a counting rate differing from that of the reference counter 33 by a differential rate representing the movement in the longitudinal direction, and the counter for transverse movement is set to count at the same rate as the reference counter 33. If the cutter movement is to be in a diagonal direction, the counters for longitudinal and transverse movement control are both set at rates that are differentially related to the reference rate so as to provide for the required amount of longitudinal and transverse movements of the cutter in its response to the respective differentials between the two control tracks and the reference track. In this case, the counting will proceed at three different rates, i.e., at the reference rate and at the longitudinal and transverse control rates. Relay 44 is then closed, as by manual actuation thereof, thus starting the operation of motor 17 and causing light chopper disc 25, brake disc 18 and worm 15 to rotate in unison. As disc 25 rotates, light from source 29, focused upon the disc by focusing lens 28, will intermittently pass through apertures 26, with intervening interruptions by the body of the disc 25, thus producing a succession of rapidly recurring light pulses impinging upon photo-electric cells 31. A correspondingly rapid recurring succession of primary (input) electric pulses is developed in circuit 32 and fed simultaneously to both of the counters 33 and 34 up to respective discharge rates for which they have been pre-set. As each counter reaches the number of pulses for which it has been pre-set, it will discharge to produce a secondary (output) pulse in its respective outlet circuit 35 or 36. These secondary pulses in circuit 35 will actuate magnetic recorder head 2 to record on film 1 the series of pulses constituting the reference record track of the film. The secondary pulses delivered from counters 34 will be delivered to recorder head 3 to record the control tracks on film 1, a small portion of the energy of these secondary pulses from one of the counters being diverted to counter 38. The amount of energy being thus diverted may be comparable to the energy level of the input primary pulses of circuit 32 and thus need not reduce the energy input to recorder head 3 sufficiently to interfere with the operation thereof. It is to be understood that suitable resistance will be utilized in circuit 37 to thus reduce the diverted energy of this circuit to a small increment of the total energy in circuit 36.

The pulses thus delivered to counter 38 are received thereby until the maximum for which this counter has been pre-set, is delivered thereto, whereupon counter 38 will discharge to provide a de-energizing pulse for triggering relay 40, applying brake 19 and simultaneously de-energizing motor 17 so as to stop the motor, the light chopper disc 25, and sprocket 11, substantially instantaneously. At this point it may be noted that the frequencies of the primary pulses in circuit 32 and the secondary pulses in circuits 35 and 36 are so related that the input frequency is extremely rapid while the secondary frequencies are relatively slow. Due to the characteristics of the electronic pulse counters, the delivery of the last secondary pulse which triggers the counter 38 for stopping the stage of operation, occurs substantially instantaneously with the delivery of the last primary pulse which triggers the operation of counter 34 to produce the aforesaid last impulse for counter 38. The motor is stopped before enough light pulses can pass through chopper disc 25 to produce another secondary pulse in circuit 35. The light pulses that are generated by kinetic rotation of disc 25 beyond the cut-off point, in the braking interval, are "remembered by" (stored in) counters 33 and 34 until a new stage of operation is initiated, and the counters start counting at the number determined by the stored pulses, so that the ensuing secondary pulse is registered exactly to its proper position on the film as determined by the distance of film movement intervening between the occurrence of the cut-off pulse, the stopping of disc 25, the resumption of rotation thereof, and the primary pulse that triggers the next secondary pulse. Thus the accuracy of spacing of signal units on the record tracks is independent of rotational speed of disc 25, and the recording apparatus is in effect geared to the film through the intervals between recording stages as well as during the recording stages.

It is to be understood that in the correlation of pulse images (signal units) on the several record tracks, the important factor is the spacing between units, and that the term "frequency" (which applies more appropriately to the reproduced signal) is used somewhat loosely as a brief term to designate such spacing between signal units of the several tracks in a relative sense, and does not refer to absolute frequency in terms of time, the latter being of relatively no importance in obtaining accurate correlation in the recording operation.

From the foregoing, it will be apparent that the "frequency" of delivery of secondary pulses from reference counter 33 and control counters 34 is purely relative, i.e., it is a dimensional relationship between the spacing of a series of control pulses to the spacing of the reference pulses, for determining a differential which is utilized for controlling, and that such "frequencies" are functionally independent of time and therefore of acceleration and deceleration in the rotating parts on and geared to shaft 16 occurring in the starting and stopping of the system. If a change in speed of rotation occurs, the actual time rate of counting may correspondingly change in all of the counters, but the ratios between the counting rates of control counters 34 and reference counter 33 will not change, and thus will not be affected by the effects of inertia in the system. Furthermore, the film 12, being geared to the rotating shaft 16, will maintain an unvarying ratio of speed rate to the rate of operation of the counting apparatus, so that the pulse recordings on the film will be uniformly related to the travel of the film (e.g. the linear dimensional spacing of the pulse images on the film, in the reference track recorded from pulse counter 33, will be unvaryingly uniform). The only effect of inertia that must be reckoned with in the system is the rotation of disc 25 past a cutoff point which distance counter 38 has shut down the system. To avoid the recording of an extra pulse from a counter 33 or 34 after counter 38 has triggered a stop, the braking mechanism is adjusted to completely stop the mechanical movement within the interval between the most closely spaced pair of succeeding pulses that will come from any of the counters 34. To account for the momentum-driven movement of disc 25 and film 12 beyond the cutoff point called for by counter 38, the pulse counter 33 continues to count the high frequency pulses produced in the slow-down interval and adds them to the pulses that are counted upon resumption of operation in the next stage thereof, so that the spacing between the last pulse recorded before the stop and the first pulse recorded after the stop, will be the same as between any other pair of pulses in the reference track.

It will be understood that distance counter 38 is primarily related to distance as measured on the record film. Such distance is directly related to the number of pulse images on the reference track of the film. Cutter movement, however, is related to the differentials between the pulses of the several control tracks and the reference track pulses for the measured section of film, and thus, for any section of film as measured by the distance counter 38, any predetermined ratio between rates of traverse movement, depth movement and longitudinal movement may be attained, depending upon the differentials between the pulses of three control tracks and the reference track.

Instead of the mechanical interlock (gearing 14, 15) between the primary pulse generator and the film drive shaft 13, the latter can be driven by a separate drive motor, synchronized (interlocked) with motor 17 through the use of any suitable known electrical interlock mechanism.

In the appended claims, where reference is made to one or two control pulse counters, each related to a reference pulse counter for producing differentially related record tracks, it is intended that such claims shall embrace any apparatus employing a number of control counters in addition to those enumerated in the claims.

I claim:

1. A system for recording on a record element, a plurality of coordinated record tracks for differentially controlling a plurality of actuators utilized in effecting directional control of a robot device, said system comprising: a plurality of recording heads; means for feeding said record element past said recording heads; a source of high frequency primary electrical pulses; a plurality of pulse counters; respective electric circuits for delivering said primary electrical pulses to said counters and for discharging to said recording heads, low frequency recording pulses as the result of predetermined accumulations of said primary pulses, said counters including a first counter for discharging reference pulses and a second counter for discharging control pulses, said second counter having means for adjustment of its counting capacity so as to vary the frequency of said control pulses to provide for a variable differential between the frequencies of said reference and control pulses; means for simultaneously starting the transmission of said high frequency pulses to said counters and the operation of said record element feeding means; a third pulse counter arranged to be energized by increments of the pulses discharged by second counter, and, upon accumulating a predetermined number of said low frequency pulses, to discharge a terminal control pulse; and means responsive to said terminal control pulse for substantially arresting the transmission of said high frequency pulses to said counters and the operation of said element feeding means.

2. A system as defined in claim 1, including a common control means for said source of high frequency pulses and said record element feeding means, operative to cause them to operate in unison.

3. A system as defined in claim 2, wherein said common control means comprises an electric motor and positive transmission means for driving said feeding means therefrom, and wherein said primary pulse source includes mechanical frequency determining means for said primary pulses, also driven by said motor.

4. A system as defined in claim 3, wherein said mechanical frequency determining means comprises an apertured light-chopper disc rotated by said motor, and said primary pulse source further includes means for generating and directing a beam of light upon said chopper disc so as to intermittently pass through the apertures thereof, to produce a series of light flashes, and a photoelectric cell positioned to receive said light flashes and to consequently generate said series of primary pulses in exactly timed relation to the feeding of said record element.

5. A system as defined in claim 1, wherein said record element feeding means includes an electric driving motor, and wherein said arresting means includes a solenoid operated brake for said motor, controlled by said terminal pulse.

6. A system as defined in claim 1, wherein said record element is an apertured tape; wherein said record feeding means includes an electric motor, a sprocket geared to said tape and a reduction gear drive from said motor to said sprocket; wherein said primary pulse source includes a frequency determining device driven by said motor to effect exact timing of the primary pulse frequency to the rate of feed of said tape; and wherein said arresting means includes a relay, responsive to said terminal control pulses, for stopping said motor.

7. A system as defined in claim 1, wherein said record element is an apertured tape; wherein said record feeding means includes an electric motor, a sprocket geared to said tape and a reduction gear drive from said motor to said sprocket; wherein said primary pulse source includes a frequency determining device driven by said motor to effect exact timing of the primary pulse frequency to the rate of feed of said tape; and wherein said arresting means includes a relay, responsive to said terminal control pulses; a motor energizing relay switch, energized through said relay to deenergize the motor, a brake for said motor, and a solenoid, energized through said relay, for actuating said brake.

8. A system for recording on a record element, a plurality of coordinated record tracks for differentially controlling a plurality of actuators utilized in effecting directional control of a machine tool element, said system comprising: a plurality of recording heads; means for feeding said record element past said recording heads; a source of high frequency primary electrical pulses; a plurality of pulse counters arranged to be energized by said pulses and to discharge to said recording heads, low frequency recording pulses as the result of predetermined accumulations of said primary pulses, said counters including a first counter for discharging reference pulses and a second counter for discharging control pulses, said second counter having means for manual adjustment of its counting capacity so as to vary the frequency of said control pulses to provide for a variable differential between the frequencies of said reference and control pulses as a variable control signal; means for simultaneously starting the transmission of said high frequency pulses to said counters and the operation of said record element feeding means; a third pulse counter arranged to be energized by increments of the pulses discharged by one of said first and second counters and, upon accumulating a predetermined number of said low frequency pulses, to discharge a terminal control pulse; and means responsive to said terminal control pulse for substantially instantaneously and simultaneously arresting the transmission of said high frequency pulses to said counters and the operation of said record element feeding means.

9. A system for recording on a record element, a plurality of coordinated record tracks for differentially controlling a plurality of actuators utilized in effecting directional control of a machine tool element, said system comprising: a plurality of recording heads; means for feeding said record element past said recording heads; a source of high frequency primary electrical pulses; a plurality of pulse counters arranged to be simultaneously energized by said pulses and to discharge to said recording heads, low frequency recording pulses as the result of predetermined accumulations of said primary pulses, said counters including a first counter for discharging reference pulses and a second counter for discharging control pulses, said second counter having means for manual adjustment of its counting capacity so as to vary the frequency of said control pulses to provide for a variable differential between the frequencies of said reference and control pulses as a variable control signal; means for simultaneously starting the transmission of said high frequency pulses to said counters and the operation of said record element feeding means; a third pulse counter arranged to be energized by increments of the pulses discharged by one of said first and second counters and, upon accumulating a predetermined number of said low frequency pulses, to discharge a terminal control pulse; and means responsive to said terminal control pulse for arresting the transmission of said high frequency pulses to said counters within the period of development of one cycle thereof, and for substantially simultaneously arresting the operation of said record element feeding means.

10. A system for recording on record means, a plurality of coordinated record tracks comprising respective series of record units having differential spacing in the respective tracks, said system comprising: a plurality of recording heads; means for feeding said record means past said recording heads with all record tracks moving at a common linear speed; a source of high frequency primary electrical pulses; a plurality of pulse counters arranged to be simultaneously energized by said pulses and to discharge to said recording heads, low frequency recording pulses as the result of predetermined accumulations of said primary pulses, said counters including a first counter for discharging reference pulses and a second counter for discharging control pulses, said second counter having means for adjustment of its counting capacity so as to vary the frequency of said control pulses to provide for a variable differential between the frequencies of said reference and control pulses; means for simultaneously starting the transmission of said high frequency pulses to said counters and the operation of said record element feeding means; a third pulse counter arranged to be energized by increments of the pulses discharged by one of said first and second counters and, upon accumulating a predetermined number of said low frequency pulses, to discharge a terminal control pulse; and means responsive to said terminal control pulse for substantially simultaneously arresting the transmission of said high frequency pulses to said counters and the operation of said record feeding means.

11. A system for recording on record means, a plurality of coordinated record tracks comprising respective series of record units having differential spacing in the respective tracks, said system comprising: a plurality of recording heads; means for feeding said record means past said recording heads with all record tracks moving at a common linear speed; a source of high frequency primary electrical pulses; a plurality of pulse counters arranged to be simultaneously energized by said pulses and to discharge to said recording heads, low frequency recording pulses as the result of predetermined accumulations of said primary pulses, said counters including a first counter for discharging reference pulses and a second counter for discharging control pulses, said second counter having means for adjustment of its counting capacity so as to vary the frequency of said control pulses to provide for a variable differential between the frequencies of said reference and control pulses; means for simultaneously starting the transmission of said high frequency pulses to said counters and the operation of said record element feeding means; a third pulse counter adjustable to various counting rates determinative of distance of movement of the record means, arranged to be energized by increments of the pulses discharged by one of said first and second counters and, upon accumulating a predetermined number of said low frequency pulses, to discharge a terminal control pulse; and means responsive to said terminal control pulse for substantially simultaneously arresting the transmission of said high frequency pulses to said counters and the operation of said record feeding means.

References Cited in the file of this patent

UNITED STATES PATENTS

| | | |
|---|---|---|
| 2,423,440 | Neergaard | July 8, 1947 |
| 2,574,104 | Ireland | Nov. 6, 1951 |
| 2,693,991 | Holtz | Nov. 9, 1954 |
| 2,710,934 | Senn | June 14, 1955 |
| 2,722,676 | Begun | Nov. 1, 1955 |
| 2,748,665 | Senn | June 5, 1956 |

OTHER REFERENCES

Electronics, February 1956, pages 122–126 (Electronic Controls for Machine Tools).